Oct. 22, 1968     A. J. POULIN     3,406,457

SPACEOMETER

Filed Aug. 19, 1966

INVENTOR
Arthur J. Poulin

United States Patent Office 3,406,457
Patented Oct. 22, 1963

3,406,457
SPACEOMETER
Arthur J. Poulin, 3 Sturtevant St.,
Waterville, Maine 04901
Filed Aug. 19, 1966, Ser. No. 573,548
3 Claims. (Cl. 33—162)

ABSTRACT OF THE DISCLOSURE

An extendable wedge gauge for measuring an opening between two surfaces.

---

This invention relates to a class of machine tools, and more in particular it relates to a device for measuring the opening between two metal plates.

It is often desirable to acurately measure the distance between two adjacent plates. Devices of this type are sometimes called spaceometers. Great difficulty is experienced in reading devices of this type, now in common use.

It is an object of the present invention to provide a wedge type spaceometer that will automatically indicate the reading obtained by the extension of the wedge.

It is a further object of this invention to provide an extendable wedge which is slidably mounted in a housing, the front edge of the housing being open to allow the extension of the wedge.

It is a still further object of this invention to provide a spaceometer of the extendable wedge type used to measure openings between metal plates where the extension of the wedge is indicated visually on a gauge.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which has been illustrated and described a preferred embodiment of the invention.

Figure 1:
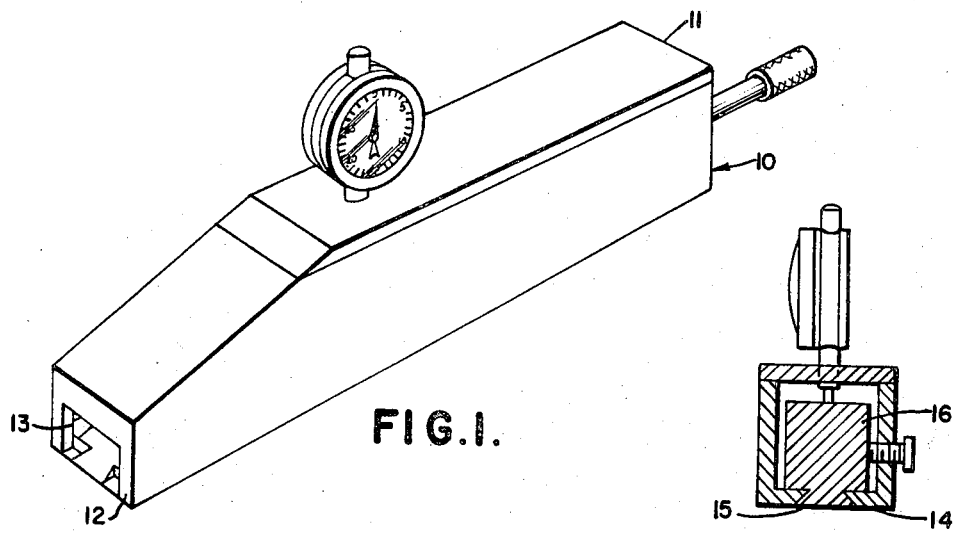
FIGURE 1 is a perspective view of the spaceometer.
Figure 3:
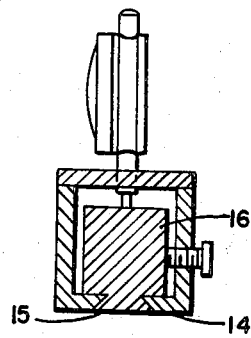
FIGURE 3 is a sectional view on line 3-3 of FIG. 2.
Figure 2:
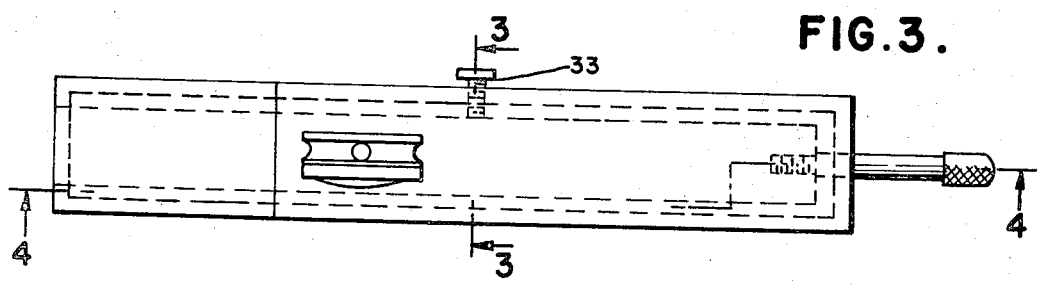
FIGURE 2 is a top plan view of the device shown in FIGURE 1.
Figure 4:
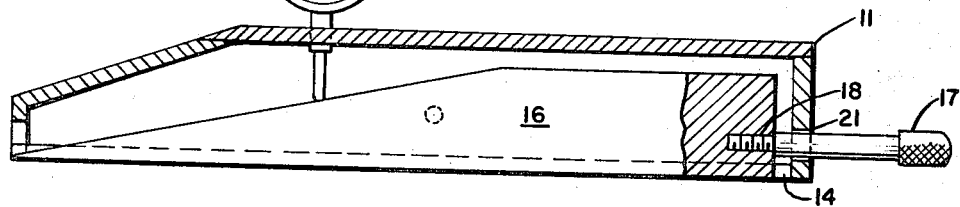
FIGURE 4 is a sectional view on line 4-4 of FIG. 2.

The spaceometer, or space gauge, shown in FIGURE 1, comprises a housing 10 with a cover plate 11 on the top thereof, and the front end plate 12 having the opening 13 therein. The bottom plate 14 has an appropriate groove 15 cut therethrough, this groove being wider at the bottom surface than at the upper surface.

The wedge 16 has the lower surface thereof cut to be received by and held in sliding engagement with the groove 15 in the bottom plate of the housing 10. The position of this wedge is adjusted by means of the push rod 17, having threads 18 on the terminal end thereof which are received in and held by a recess 21 in the rear face of the wedge 16.

The cover plate 11 has an opening 19 therein. Mounted within this opening is a vertical casing 20. Mounted within the casing 20 is a spring loaded contact rod 25. Mounted on the casing 20 is the gauge 26 having the indicator hand 27 pivoted in the center thereof. This indicator hand is attached to the rod 25 which bears against the upper surface of the wedge 16 and when the wedge is moved forwardly the rod 25 is retracted into the casing 20 and causes the hand 27 to rotate on the gauge 26 indicating the extension of the wedge 16, which is only limited by the opening 30 between the plates 31 and 32. The position of the hand 27 on the gauge 26 thereby indicates the opening 30 between the plates 31 and 32.

Figure 5:
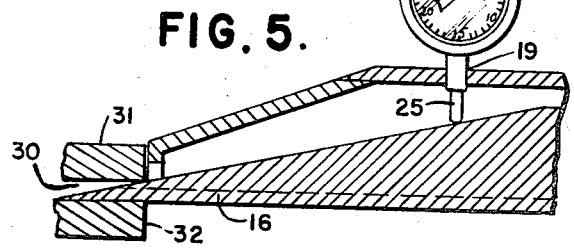
FIGURE 5 is a view partially in section, showing the wedge extended.

If it is desired, the set screw 33 may be tightened to retain the wedge 16 in any position that it may attain, such as the position shown in FIGURE 5. This will permit the locking of the wedge 16 in any position to facilitate reading the gauge which will indicate the space 30 between the plates 31 and 32.

What is claimed is:

1. A space gauge comprising a housing open at one end, said housing having an upper plate, a bottom plate, an end plate, a wedge slidably mounted in said housing, a vertical casing mounted in the upper plate of said housing, said vertical casing having a contact rod therein connected to an indicating gauge mounted on said vertical casing, said contact rod being in sliding engagement with said wedge mounted in said housing to indicate the position of the wedge with respect to said open end of said housing.

2. A space gauge, as claimed in claim 1, wherein the wedge is slidably retained by the bottom plate of the housing.

3. A space gauge as claimed in claim 1, wherein the position of the sliding wedge is controlled by means of a push rod mounted on the end of the wedge protruding through the end plate of the housing.

References Cited

UNITED STATES PATENTS

| 450,065 | 4/1891 | Fontaine | 33—162 |
| 2,329,828 | 9/1943 | Clark | 73—1 |
| 2,882,605 | 4/1959 | Frauenholtz | 33—168 |
| 2,979,824 | 4/1961 | Hymer | 33—178 |
| 3,043,013 | 7/1962 | Molinaro | 33—162 |
| 3,171,205 | 3/1965 | Kurtz | 33—143 X |

WILLIAM D. MARTIN, Jr., *Primary Examiner.*